April 9, 1940.   C. LACHMAN   2,196,772
FRUIT PITTING MACHINERY
Filed June 9, 1938
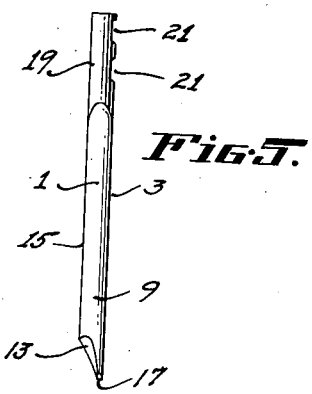
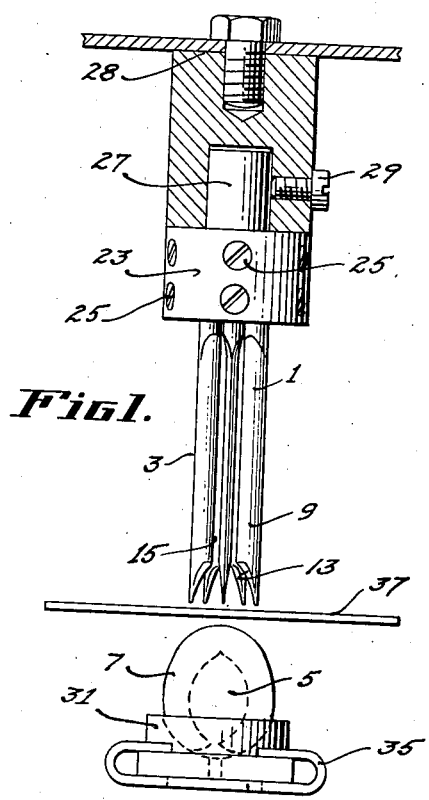
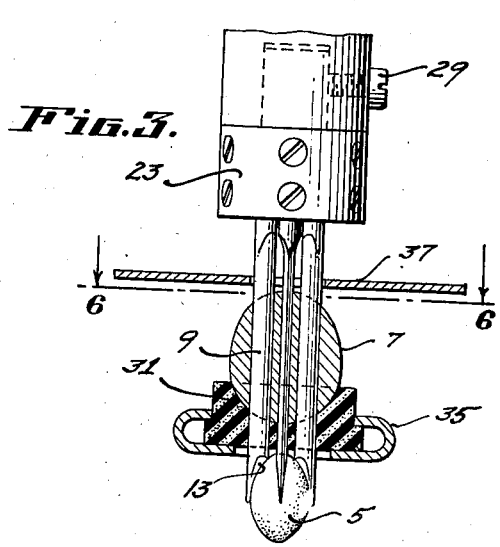
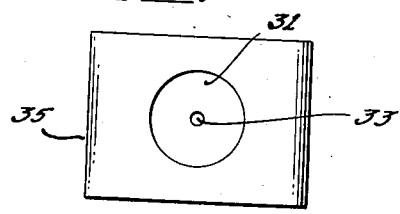
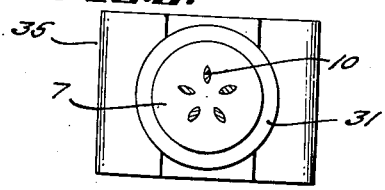
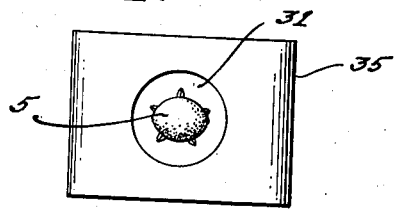
INVENTOR.
CHARLES LACHMAN
BY
Lippincott & Metcalf
ATTORNEYS.

Patented Apr. 9, 1940

2,196,772

UNITED STATES PATENT OFFICE 2,196,772

FRUIT PITTING MACHINERY

Charles Lachman, San Francisco, Calif., assignor to S. & W. Fine Foods, Inc., San Francisco, Calif., a corporation of California Application June 9, 1938, Serial No. 212,643

3 Claims. (Cl. 146—19)

My invention relates to fruit pitting machinery more particularly to a pitting tool for use in such machinery.

In the marketing of prepared fruit such as cherries, olives and the like, it is very desirable to maintain the original form and appearance of the fruit so as not to destroy its appeal to the buying public. The preparation of such fruit necessitates the removal of the pits therefrom. When this operation is performed by manual labor, the pits can readily be removed through the stem holes without cutting or otherwise injuring the fruit at any other point on its surface. Aside from the expense involved and the relative slowness of operation, manual removal of pits from fruit does not present any unusual problems.

In accomplishing the removal of pits by machinery however, the fruit is individually positioned beneath a pitting tool which passes completely through the fruit, pushing the pit before it and causing it to emerge through the bottom.

The pitting tool is normally given a reciprocating movement and the fruit is individually carried on endless conveyor belts to its pitting position beneath the tool in synchronism with the downward thrust of the tool. These belts carry a series of resilient rubber cups, each of a size adapted to carry a single fruit, and formed with a perforated bottom centrally thereof. As the cup arrives in pitting position beneath the reciprocating pitting tool, the tool descends, cuts its way through the fruit centrally thereof, and continues on its descending or pitting stroke sufficiently to force the pit out of the fruit and through the perforation in the bottom of the rubber cup.

If it is desired to maintain continuous movement of the conveyor throughout the pitting operations, the reciprocating pitting tool while reciprocating can be given a lateral component of motion in the direction of movement of the cups so as to cause it to travel with the fruit during the pitting operation. It will be apparent that a real problem is presented in order to carry on a pitting operation as described and at the same time preclude the pitting tool from tearing or otherwise disfiguring the fruit during the pitting operation, so that a normal appearance of the fruit after the pitting operation may be realized.

It is accordingly an object of my invention to provide improved pitting means which will efficiently remove the pits from fruit without marring its appearance.

Another object of my invention is to provide improved pitting means capable of pitting fruit without any apparent change of shape or contour of the fruit occurring as a result of the pitting operation.

A further object of my invention is to provide improved pitting means capable of removing pits from fruit in such a manner as to enable the fruit of its own accord to restore itself to its natural form and appearance.

An additional object of my invention is to provide pitting means of simple construction capable of economic operation.

Additional objects of my invention will be brought out in the following description of the same taken in conjunction with the accompanying drawing, wherein Fig. 1 is a vertical elevational view of the improved pitting tool shown in relationship to a conveyor cup just prior to the moment when the pitting tool enters the fruit during its pitting stroke.

Fig. 2 is a view looking toward the underside of the conveyor cup and mounting.

Fig. 3 is a view partly in section showing the improved pitting tool and its relationship to the conveyor cup and its fruit content at the termination of the pitting stroke of the tool.

Fig. 4 is a view looking toward the underside of the conveyor cup and mounting with the pitting tool in the position indicated in Fig. 3.

Fig. 5 is an elevational view of one of the slitting knife elements.

Fig. 6 is a view taken along the line 6—6 of Fig. 3.

Fig. 7 is a view to illustrate the effect which the pitting tool has on the fruit after a pitting operation.

The above views are substantially to scale.

The improved pitting tool comprises a plurality of slitting knife elements 1 positioned about a central axis in spaced parallel relationship to each other, the outer edges 3 of the elements lying in the surface of an imaginary cylinder, the diameter of which is somewhat greater than the pit 5 of the fruit 7 for which the tool is designed, but of materially less diameter than that of the fruit itself.

Each of the individual slitting knife elements 1 is made long and slender and has an active portion 9 of substantially flat oval shape cross section 10. By active portion is meant at least that portion of each element 1 which at some time or other during the pitting stroke of the tool enters the fruit 7.

The fruit engaging end of each slitting knife element 1 is provided with a slicing edge 13 to facilitate insertion into the fruit in a clean cut manner without tearing or otherwise marring the surface or pulp portion of the fruit. Such edge 13 is formed by sloping the inner edge 15 of each element toward its outer edge 3 and tapering such sloping portion to a cutting edge by grinding or otherwise. This cutting edge 13 may either terminate in a bottom edge 17 (Fig. 5) in which case this bottom edge will also be tapered to a cutting edge or the cutting edge 13 may terminate at the outer edge 3 of the element (Fig. 1) in which case the element will not have a bottom edge, but will be sharply pointed.

The end 19 of the slitting knife element 1 opposite that of the fruit engaging end may be of circular cross section and provided with set screw engaging slots 21 for mounting in a suitable holder 23. Such slots 21 are formed in alinement with the outer edge 3 of the element 1 so that when mounted in the holder 23 the longer cross sectional axis will be directed toward the central axis about which the elements 1 are assembled. This manner of assembling the elements will thus cause the inner edges 15 of the elements to face each other, and by reason of the presence of the sloping knife edge portion 13 on the fruit engaging end of each element, such elements when assembled in the manner described constitute a cage of gradually decreasing diameter in the direction away from the fruit engaging end of the tool.

The holder 23 is provided with a plurality of holes arranged about the central axis thereof and adjacent each other, each hole being of a diameter to snugly receive one of the knife elements. The holders are provided with lateral radial channels connected with the aforementioned openings and threaded for the reception of set screws 25, the set screw channels being so positioned as to be in alinement with the slots 21 formed in each element 1. Thus the set screws 25 are adapted to be threaded into clamping engagement against the slotted portions of knife elements and thus provide positive means for retaining such elements in rigid assembled relationship to each other.

In view of the fact that the set screws must necessarily be of hardened steel, such elements are apt to rust and in order to preclude the possibility of such rust, if occurring, from coming into contact with the fruit by way of the pitting tool, the openings in the holder 23 might be coated to advantage with a nitro-cellulose cement solution prior to assembling the knife elements and set screws therein, the assembling of such elements taking place before the cement has had an opportunity to dry.

The holder 23 with the elements assembled therein constitutes the pitting tool and such holder is provided with any suitable means for clamping the same to a reciprocating cross arm or mounting for actuating the tool along the proper reciprocating path with respect to the fruit to be operated upon for the removal of the pit. For this purpose the holder 23 is provided with a shank 27 of somewhat smaller diameter than the holder proper, this shank being adapted for insertion into a mounting generally referred to by the reference numeral 28, and retained therein by a set screw 29. Since the particular construction of the mounting is immaterial insofar as the purpose and function of the improved pitting tool is concerned, such mounting will not be described in detail. It is only essential that the pitting tool be reciprocated with respect to the conveyor cups which carry the fruit to a position below the reciprocating tool.

Each conveyor cup 31 is formed of flexible rubber material having a cup shaped portion of a size enabling the cup to carry a single fruit 7. The bottom of the cup is provided with a single perforation 33 of a diameter substantially less than any diameter of the pit 5 present in the fruit 7 to be processed, the rubber however, having sufficient elasticity to enable such pit to be forced through this perforation. The rubber cup 31 is supported in a suitable carrier 35 having looped ends enabling the same to be linked in chain formation to constitute an endless chain.

In the operation of pitting, the fruit 7 is placed on the cup 31 with its stem opening facing the perforation 33 and in this position the fruit is conveyed by the cup to its pitting position below the reciprocating pitting tool. The tool descends, slicing its way into the fruit and due to the cagelike formation previously referred to, the tool will span the pit 5, centering the same with respect to the perforation 33, and upon further descent, will force the pit 5 out of the fruit 7 and through the perforation. The knife elements 1 at this point in the pitting stroke will have penetrated through the rubber cup 31 at points about the perforation 33 but spaced therefrom. By reason of the presence of rubber between the various elements at the termination of the pitting stroke, the bottom of the cup has sufficient restoring force to restore itself to its normal position, bringing the perforation back to its normal size, and therefore precluding the expelled pit from being returned back into the fruit upon the withdrawal of the pitting tool. The pit is thus caused to drop to the floor or into a suitable container provided for the purpose.

Any suitable stripping device 37 may be supported just above the fruit, being perforated to permit reciprocal movement of the tool therethrough, but precluding lifting of the fruit from the cup upon withdrawal of the tool therefrom.

By reference to Fig. 6 it will be noted that the perforations or slits made by the pitting tool are individual and separate from each other, each slit being surrounded by solid fruit pulp and skin, thus enabling the fruit to resist deformation during pitting. The perforations made through the skin of the fruit during the pitting stroke are not of the size or shape indicated in Fig. 6, because the cutting edges in entering the fruit produce a line cut and the increase in cross section of each knife element 1 from its cutting edge 13 to its normal flat oval shape cross section 10, merely depresses the edges of the cut made by the cutting edge. Upon withdrawal of the pitting tool, the resiliency of the fruit which is maintained due to the presence of solid pulp around each slit serves to restore the skin to its normal position, therefore closing up the openings made by the tool elements. The pitted fruit will therefore present an appearance such as indicated in Fig. 7, and when the further processing of the fruit involves a cooking operation the "wounds" are healed to an even greater extent, so that the fact that the skin has been cut is not apparent except upon very close scrutiny and examination.

It will be apparent from the above description of the improved pitting tool, that it will perform in a most efficient manner and will otherwise fulfill all the objects of the invention as set forth.

While a preferred embodiment of the invention has been described it will be apparent that the tool is subject to modification without departing from the scope of invention involved. The cutting edges 13 for example may either be straight or arcuate in form; and in assembling such elements 1 in a holder 23, the same may be accomplished without the use of set screws 25 merely by pouring molten solder through the lateral openings which connect with the holes in which the elements 1 are inserted. When solder is employed for assembling the elements 1 in the holder 23, the use of nitrocellulose cement will not be necessary, since solder is not subject to rusting. In lieu of constructing the pitting tool of separately fabricated knife elements assembled in the manner described, they may all be formed as a unit from a single piece of bar stock, adapted for mounting in a holder 23 of the type described. Therefore in view of the many changes of which the improved pitting tool is capable, it is desired that the protection shall not be limited to the specific details of the preferred embodiment described, except as may be necessitated by the prior art and the appended claims.

I claim:

1. A pitting tool for fruit or the like comprising at least three parallel arranged elements, positioned about a central axis in spaced relationship to each other, each of said elements having an active portion of substantially oval cross section with the longer cross section axis directed substantially toward the central axis and having the inner ridge of its fruit engaging end tapered to a cutting edge.

2. Pitting mechanism comprising a pitting tool as recited in claim 1 wherein said cutting edges are longitudinally shaped to provide a pit receiving recess in the end of said assembly, and a seat for a fruit to be pitted positioned beneath said tool, said seat being formed of resilient material, and having a circular perforation therethrough in alignment with the axis of said tool and of a diameter substantially less than that of the pit in said fruit, and means for moving said tool relative to said seat a sufficient distance to cause said tool to enter said fruit, receive the pit in said recess and force the tool and the pit through said aperture by expansion thereof.

3. Apparatus in accordance with claim 2 wherein the depth of said recess is less than the length of the received pit whereby the pit precedes the tool through the aperture and causes the initial expansion thereof.

CHARLES LACHMAN.